United States Patent
Murakami

(10) Patent No.: US 8,040,006 B2
(45) Date of Patent: Oct. 18, 2011

(54) MOTOR ROTOR AND ELECTRIC POWER STEERING APPARATUS

(75) Inventor: Toshiaki Murakami, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 251 days.

(21) Appl. No.: 12/428,562

(22) Filed: Apr. 23, 2009

(65) Prior Publication Data

US 2009/0267438 A1    Oct. 29, 2009

(30) Foreign Application Priority Data

Apr. 25, 2008   (JP) ................... 2008-115137

(51) Int. Cl.
  *H02K 1/28*   (2006.01)
(52) U.S. Cl. ......... 310/156.21; 310/156.08; 310/156.28; 310/156.19
(58) Field of Classification Search ............. 310/156.21, 310/156.08, 156.28, 156.19, 156.29
  See application file for complete search history.

(56) References Cited

U.S. PATENT DOCUMENTS

| | | | | |
|---|---|---|---|---|
| 4,742,259 A | * | 5/1988 | Schaefer et al. | 310/156.28 |
| 4,954,736 A | * | 9/1990 | Kawamoto et al. | 310/156.21 |
| 5,063,318 A | * | 11/1991 | Anderson | 310/156.19 |
| 5,760,520 A | * | 6/1998 | Hasebe et al. | 310/156.19 |
| 7,545,067 B2 | * | 6/2009 | Drexlmaier | 310/156.13 |
| 2004/0140725 A1 | * | 7/2004 | Takahashi | 310/156.21 |
| 2009/0102304 A1 | * | 4/2009 | Yamamura et al. | 310/156.28 |
| 2009/0261677 A1 | * | 10/2009 | Ishikawa et al. | 310/156.12 |

FOREIGN PATENT DOCUMENTS

| | | | |
|---|---|---|---|
| JP | 6-38417 | * | 2/1994 |
| JP | 2006-271057 | | 10/2006 |

* cited by examiner

*Primary Examiner* — Burton Mullins
(74) *Attorney, Agent, or Firm* — Oblon, Spivak, McClelland, Maier & Neustadt, L.L.P.

(57) ABSTRACT

A motor rotor has a rotor yoke having a polygonal column structure, a plurality of magnet fixing sections formed on the lateral surface of the rotor yoke, segment magnets respectively fixed to the magnet fixing sections and extending in the axial direction of the rotor yoke, and projections provided on the rotor yoke and protruding outward from the rotor yoke, the projections being provided at each boundary section located between each of the adjacent magnet fixing sections and being provided in pairs in the axial direction of the rotor yoke.

8 Claims, 9 Drawing Sheets

MOTOR ROTOR AND ELECTRIC POWER STEERING APPARATUS

INCORPORATION BY REFERENCE

The disclosure of Japanese Patent Application No. 2008-115137 filed on Apr. 25, 2008 including the specification, drawings and abstract is incorporated herein by reference in its entirety.

BACKGROUND OF THE INVENTION

1. Field of the Invention

The invention relates to a motor rotor which has segment magnets extending in the axial direction of a rotor yoke and respectively fixed to a plurality of magnet fixing sections formed on the lateral surface of the rotor yoke, and an electric power steering apparatus provided with a motor having the rotor as a motive power source.

2. Description of the Related Art

This type of rotor has a structure in which a plurality of grooves extending in the axial direction of a rotor yoke are formed on the lateral surface thereof, and segment magnets are fixed in each groove by being received therein. The segment magnets are sandwiched in the width direction by projections formed between adjacent grooves, and movement of the segment magnets in the width direction is restricted (see Japanese Patent Application Publication No. 2006-271057 (JP-A-2006-271057)).

However, as shown in the magnetic flux distribution diagram of FIG. 9, when a projection 2 is provided between segment magnets 1,1, although magnetic flux should inherently pass between the segment magnets 1 and the stator core 3 of the motor, magnetic flux extends in the form of a loop between the segment magnet 1 and the projection 2, resulting in the occurrence of so-called "magnetic leakage". For example, the magnetic leakage is occurring on the right end of the segment magnets 1 in FIG. 9. In a rotor as described above, since projections are formed continuously extending between both ends of the rotor yoke in the axial direction, leakage of magnetism to the projections occurs over the entire axial direction of the rotor yoke, thereby resulting in the problem of exacerbation of motor characteristics. In addition, in an electric power steering apparatus assisted by a motor, it is necessary to improve motor characteristics since exacerbation of motor characteristics is transmitted to the hands and a driver feels poor steering feel.

SUMMARY OF THE INVENTION

An object of the invention is to provide a motor rotor capable of improving motor characteristics, and an electric power steering apparatus provided with a motor having this rotor.

The motor rotor according to an first aspect of the invention has a rotor yoke, a plurality of magnet fixing sections formed on the lateral surface of the rotor yoke, segment magnets respectively fixed to the magnet fixing sections and extending in the axial direction of the rotor yoke, and projections provided on the rotor yoke and protruding outward from the rotor yoke, and the projections are provided at each boundary section located between each of the adjacent magnet fixing sections and provided in pairs in the axial direction of the rotor yoke.

According to the first aspect as described above, the projections are provided in pairs in the axial direction of the rotor yoke. Namely, since the projections are partially provided in the axial direction of the rotor yoke, leakage of magnetism to the projections can be held to a low level as compared with being formed continuously between both ends of the rotor yoke in the axial direction. As a result, motor characteristics can be improved. That is, output torque, cogging torque and torque ripple are reduced.

In addition, in the motor rotor according to the first aspect, the projections provided in pairs in the axial direction of the rotor yoke may also be arranged at locations between both ends of the rotor yoke in the axial direction and the center of the rotor yoke in the axial direction.

Here, the projections preferably have a certain degree of length in the axial direction of the rotor yoke to ensure strength of the projections and prevent concentration of stress in the segment magnets. However, in the case of arranging each projection so that the distance between both ends on the side mutually away from the projections provided in pairs in the axial direction of the rotor yoke is longer than the axial length of the segment magnets, it is necessary to make the length of the projections excessively longer than the required minimal length for ensuring strength and preventing concentration of stress. The reason for this is as described below.

Namely, there is the possibility that the locations of the segment magnets in the magnet fixing sections may be shifted in the axial direction from the designed reference positions depending on the dimensional tolerance of the segment magnets and rotor yoke and the mounting tolerance of the segment magnets to the rotor yoke. Consequently, it is necessary to make the length of the projections excessively longer than the minimum length corresponding to the amount of that shift. However, increasing the length of the projections has the possibility of causing a corresponding reduction in the effect of inhibiting magnetic leakage.

In contrast, according to the above second aspect, since projections provided in pairs in the axial direction of the rotor yoke are arranged at locations closer to the center of the rotor yoke in the axial direction than both ends of the rotor yoke in the axial direction, the length of the projections in the axial direction of the rotor yoke is only required to be the minimum length required to ensure strength and prevent concentration of stress, thereby eliminating the need to make them excessively long in consideration of the amount of shift attributable to tolerance. Thus, magnetic leakage can be inhibited more effectively.

In addition, in the motor rotor according to the second aspect, an adhesive depression, which is formed by depressing the intermediate portion of the rotor yoke in the axial direction relative to both ends of the rotor yoke, may be formed in each of the magnet fixing sections, and the projections may be arranged at locations sandwiched by the adhesive depressions of the adjacent magnet fixing sections.

According to the above third aspect, as a result of forming adhesive depressions in the magnet fixing sections, an adhesive layer of a prescribed thickness is formed between the magnet fixing sections and the segment magnets. Consequently, the segment magnets can be securely adhered as compared with the case of not providing adhesive depressions. In addition, since thermal deformation of the segment magnets and rotor yoke can be absorbed by the adhesive, stress acting on the segment magnets can be alleviated making it possible to prevent damage. Moreover, the projections are arranged at locations sandwiched between adhesive depressions of adjacent magnet fixing sections. Consequently, when the segment magnets are fixed in the magnet fixing sections, adhesive pushed out in the width direction of the segment magnets can be made to enter between both sides of the segment magnets in the width direction and the projections. As a result, the segment magnets can be adhered not only by the magnet fixing sections but by the projections as well.

In addition, in the motor rotor according to the third aspect, a cylindrical cover may be provided that engages with the outside of the rotor yoke and covers the plurality of segment magnets.

According to the above fourth aspect, the segment magnets are prevented from detaching in the radial direction of the rotor by the cylindrical cover, and pieces are prevented from flying off even if a portion of the segment magnets is chipped.

In addition, the motor rotor according to the fourth aspect may be applied to an electric power steering apparatus.

In the case of applying the motor rotor according to the above fifth aspect to an electric power steering apparatus, steering feel can be improved since a motor with improved characteristics can be used as a motive power source for assisting the steering effort of a steering wheel in a vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
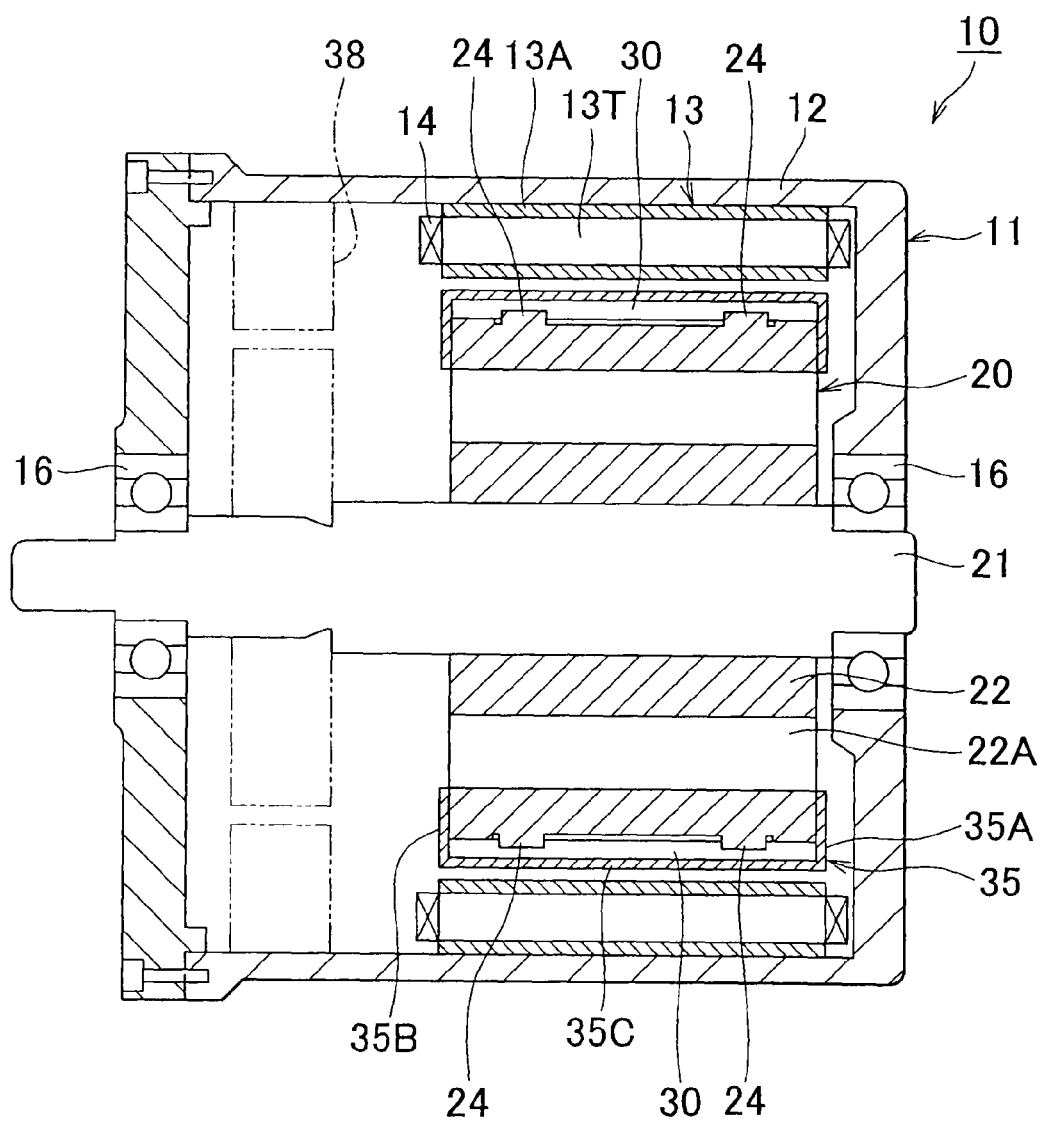
FIG. 1 is a lateral sectional view of a motor according to an embodiment of the invention.

The following provides an explanation of a first embodiment of the invention based on FIGS. 1 to 4. A motor 10 shown in FIG. 1 is a brushless, three-phase alternating current motor, and a stator 11 of this motor 10 employs a structure in which a stator core 13 is fixed to the inside of a motor housing 12 by engaging therewith. The motor housing 12 has the form of, for example, a cylinder that is closed on both ends. In addition, the stator core 13 has a structure in which a plurality of teeth 13T are protruding radially inward from the inner peripheral surface of a cylindrical body 13A, and electromagnetic coils 14 are respectively wound around each of these teeth 13T.

Figure 2:
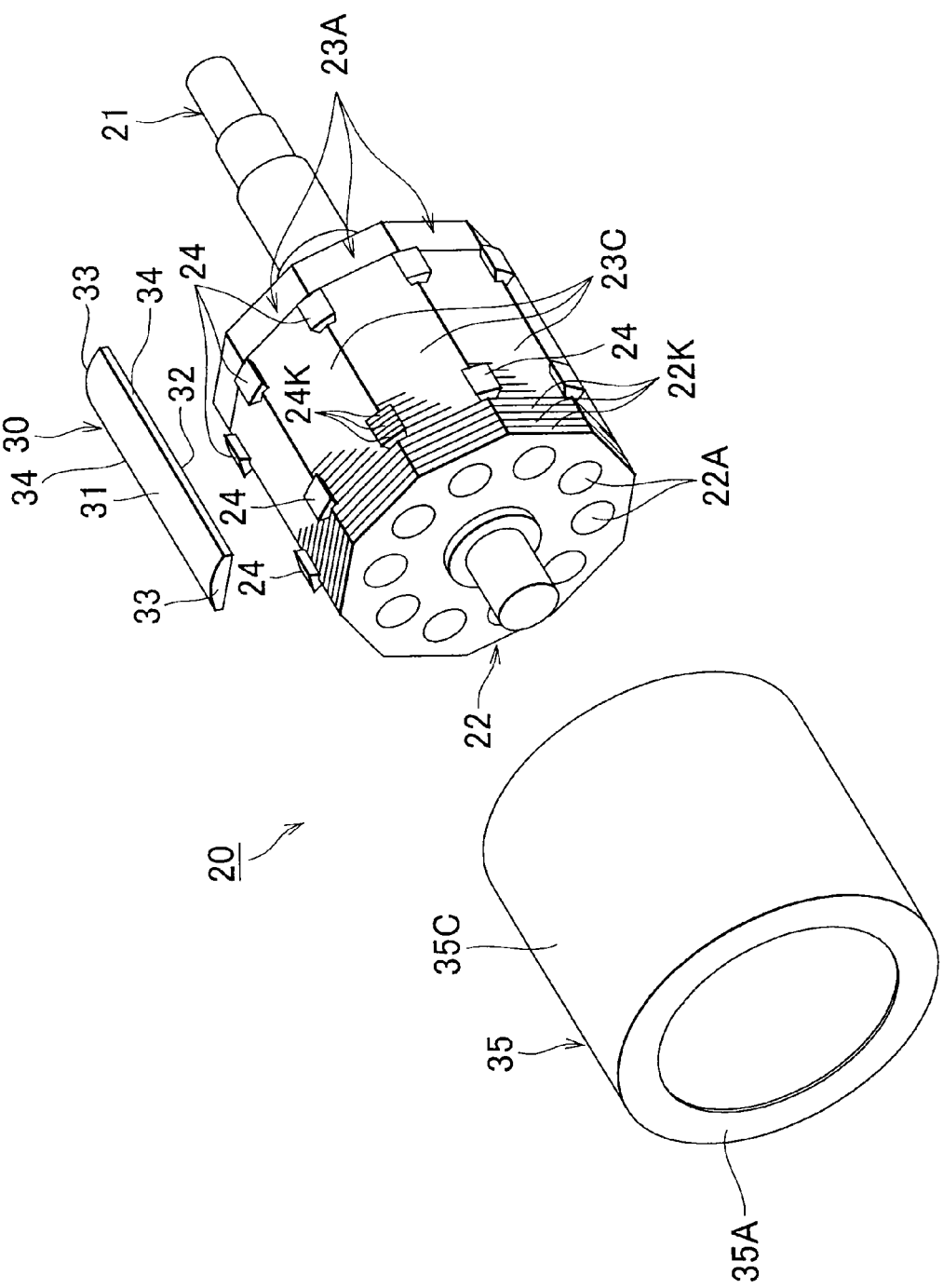
FIG. 2 is an exploded perspective view of a rotor.

A rotor 20 of this motor 10 has a structure in which a rotor shaft 21 passes through the center of a rotor yoke 22, and a plurality of segment magnets 30 are fixed to the lateral surface of the rotor yoke 22. As shown in FIG. 2, the segment magnets 30 are roughly in the form of long plates extending in the axial direction of the rotor yoke 22, and are provided with a fixing flat surface 32 on the lateral surface on the side of the rotor yoke 22, and a first curved surface 31 on the side opposite from the fixing flat surface 32. The first curved surface 31 has the form of a circular arc that gradually protrudes from both ends in the axial direction of the segment magnet 30 towards the center in the width direction. In addition, both side surfaces 34 in the axial direction and both ends 33 in the width direction of the segment magnets 30 are at right angles to the fixing flat surface 32.

The rotor yoke 22 is composed by laminating a plurality of steel sheets 22K. For example, the plurality of steel sheets 22K is silicon steel sheets. The rotor yoke 22 is in the shape of a polygonal column having an overall shape of a regular polygon such as a regular decagon. The flat surface of each side of the regular polygon is a magnet fixing section 23A according to the invention, and as shown in FIG. 2, a fixing flat surface 32 of the segment magnet 30 is fixed to each magnet fixing section 23A.

Figure 4:
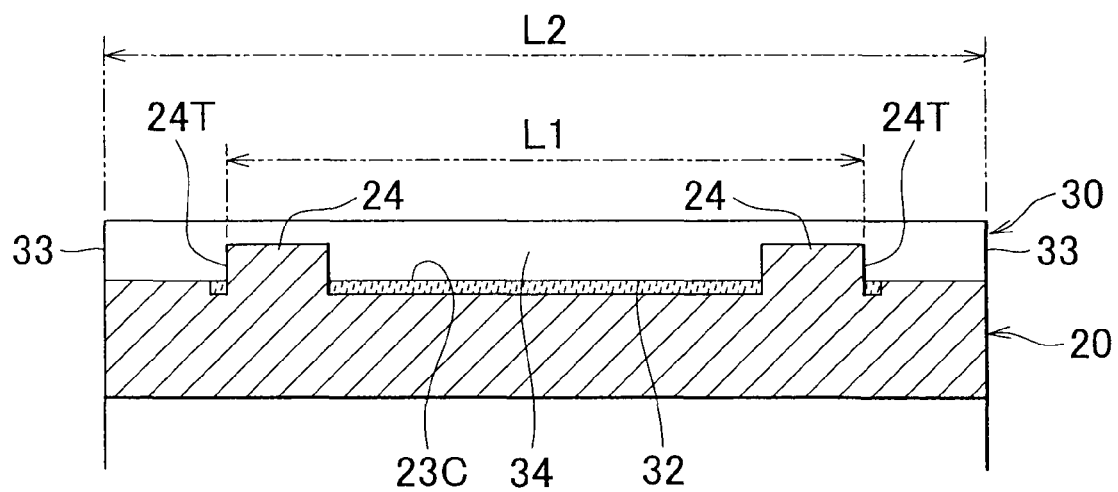
FIG. 4 is a lateral sectional view of a projection.

In this embodiment, the fixing flat surfaces 32 of the segment magnets 30 are fixed to the magnet fixing sections 23A by an adhesive. Among each of the magnet fixing sections 23A, an adhesive depression 23C, which is depressed to an extremely shallow depth, for example, about 0.5 mm relative to both ends of the rotor yoke 22 is formed in the central portion of the rotor yoke 22 in the axial direction. When the segment magnets 30 are fixed to the magnet fixing sections 23A by an adhesive, an adhesive layer of a prescribed thickness is formed between the adhesive depressions 23C and the fixing flat surfaces 32 as shown in FIG. 4. Furthermore, as shown in FIG. 2, the weight of the rotor yoke 22 is reduced as a result of a plurality of holes 22A being formed in the rotor yoke 22 around the penetrating portion of the rotor shaft 21. Projections 24 according to the invention are formed protruding from those portions sandwiched between adjacent adhesive depressions 23C among each of the corners of the polygon in the rotor yoke 22.

Figure 3A:
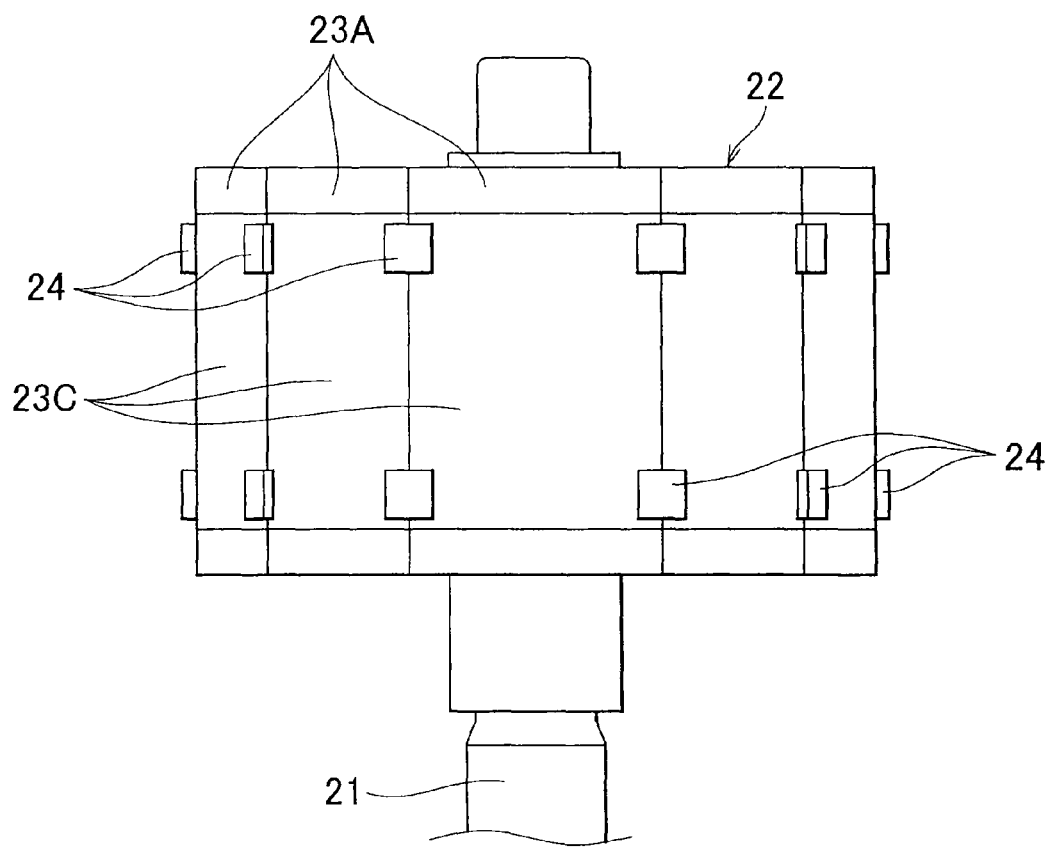
FIG. 3A is a side view of a rotor yoke.

As shown in FIG. 3A, the projections 24 are provided at locations each at the same distance away from the center in the axial direction of the rotor yoke 22 on both ends thereof, and in this embodiment, each projection 24 is arranged a location closer to both ends than the center of the rotor yoke 22 in the axial direction. Furthermore, the projections 24 provided in pairs in the axial direction of the rotor yoke 22 may also be arranged at locations closer to the center than both ends of the rotor yoke 22 in the axial direction, for example, locations that divide the rotor yoke 22 into three equal portions in the axial direction, or may be arranged exactly in the middle between both ends and the center in the axial direction.

As shown FIG. 2, Each projection 24 is composed by laminating protruding pieces 24K protruding from a portion of the group of steel sheets 22K laminated between both ends and the center of the rotor yoke 22 among the plurality of steel sheets 22K composing the rotor yoke 22. Furthermore, each of the laminated steel sheets 22K is positioned so as not to mutually shift out of position by interlocking sections, for example, not shown.

Figure 3B:
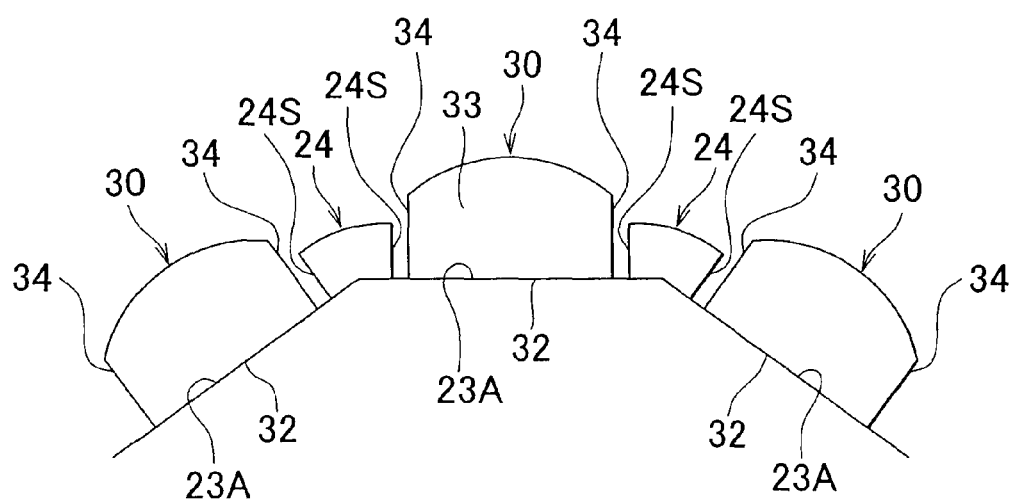
FIG. 3B is a front view of a rotor yoke.

An enlarged view of the projections 24 is shown in FIG. 3B. As shown in FIG. 3B, both side surfaces 24S of the projections 24 rise from the mutually adjacent magnet fixing sections 23A at roughly a right angle. As a result, together with both side surfaces 34 of the segment magnets 30 being in parallel with the side surfaces 24S of the projections 24, the projections 24 have a structure in which the width thereof gradually widens the farther away from the magnet fixing sections 23A. In addition, a prescribed clearance is provided between both side surfaces 34 of the segment magnets 30 and both side surfaces 24S of the projections 24.

Furthermore, among the projections 24, the outer surfaces thereof facing to the outside of the rotor 20 in the radial direction have a second curved surface concentric with the center of the rotor 20, and the radius of the circle that includes that outer surface is smaller than the distance between the portion of the first curved surface 31 of the segment magnets 30 closest to the center of the rotor 20 such as both ends in the width direction of the first curved surface 31 and the center of the rotor 20.

The length of the projections 24 in the axial direction of the rotor yoke 22 it set to be the minimum required length for ensuring strength capable of preventing deformation by external stress and preventing concentration of stress in the segment magnets 30, and more specifically, the laminated thickness of six to eight steel sheets 22K, for example. Furthermore, among all of the steel sheets 22K composing the rotor yoke 22, the number of steel sheets 22K having the projections 24K is less than the number of steel sheets 22K not having the projections 24K.

Here, as shown in FIG. 4, a distance L1 between mutually separated end surfaces 24T of the projections 24 provided in pairs in the axial direction of the rotor yoke 22 is shorter than an overall length L2 of the segment magnets 30. Each projection 24 is arranged such that the both end surfaces 24T are located closer to the center of the rotor yoke 22 in the axial direction than both ends 33 of the segment magnets 30.

A cylindrical cover 35 is engaged with the outside of the rotor yoke 22 and covers the segment magnets 30. As shown in FIG. 1, the cylindrical cover 35 has a structure in which thin-walled cylindrical portion 35C makes inside contact with the segment magnets 30, and flanges 35A, 35B protrude radially inward from both ends of the cylindrical portion 35C. The flanges 35A, 35B are locked to both ends of the rotor yoke 22.

As shown in FIG. 1, the rotor 20 is arranged so that the entirety of each segment magnet 30 in the lengthwise direction faces the inside of the stator core 13. Both ends of the rotor shaft 21 are rotatably pivotally supported by bearings 16 incorporated in both end walls of the motor housing 12.

Furthermore, a rotational position sensor 38 for detecting a rotational position of the rotor 20 is incorporated within the motor 10 of this embodiment.

The configuration of the motor 10 of this embodiment is as described above. Next, an explanation is provided of a method for producing the above-mentioned rotor 20. In producing the rotor 20, a laminate consisting of a plurality of steel sheets 22K not having protruding pieces 24K and a laminate consisting of a plurality of steel sheets 22K having protruding pieces 24K are joined to produce the rotor yoke 22, and the rotor shaft 21 is then passed through the rotor yoke 22.

Next, an adhesive is applied to the adhesive depressions 23C in the magnet fixing sections 23A of the rotor yoke 22. The fixing flat surface 32 of each segment magnet 30 is then adhered to each magnet fixing section 23A of the rotor yoke 22. More specifically, the fixing flat surfaces 32 of the segment magnets 30 are pressed against the magnet fixing sections 23A at locations where both ends 33 of the segment magnets 30 are aligned with both ends of the rotor yoke 22. Whereupon, together with the adhesive spreading over the entire adhesive depressions 23C, a portion thereof is pushed out in the width direction of the segment magnets 30, and enters the clearance between both side surfaces 34 of the segment magnets 30 and the projections 24. As a result, together with the fixing flat surfaces 32 of the segment magnets 30 being adhered to the magnet fixing sections 23A, both side surfaces 34 in the width direction of the segment magnets 30 are adhered to the projections 24 sandwiched by the segment magnets 30 in the width direction. In addition, since adhesive is filled into the clearance, play of the segment magnets 30 can be prevented.

Next, the cylindrical cover 35 shown in FIG. 2 is engaged with the rotor yoke 22. Here, the cylindrical cover 35 has one of the flanges 35B, for example, of the pair of flanges 35A, 35B is formed separately from the cylindrical portion 35C, and the flange 35B is welded or brazed, for example, to the cylindrical portion 35C after having engaged the cylindrical portion 35C with the outside of the rotor yoke 22, thereby completing the rotor 20.

Next, an explanation is provided of the interaction and effects of the rotor 20 and the motor 10 of this embodiment. When a motor drive current in the form of a three-phase alternating current is applied to the motor 10, the intensity and direction of the magnetic flux of the plurality of electromagnetic coils 14 provided in the stator 11 change, and the rotor 20 rotates relative to the stator 11 due to magnetic force between each of the electromagnetic coils 14 and the segment magnets 30. Here, the electromagnetic coils 14 generate heat as a result of the application of current. The temperature of the rotor 20 rises due to this heat. Whereupon, due to a difference in the coefficients of thermal expansion between the rotor yoke 22 and the segment magnets 30, adhesive between the rotor yoke 22 and the segment magnets 30 is subjected to stress. At this time, since the adhesive functions as a cushioning material to absorb thermal deformation of the segment magnets 30 and the rotor yoke 22, stress acting on the segment magnets 30 can be alleviated.

However, if the motor 10 is frequently used at a high load and the number of opportunities for reaching a high temperature increases, cracks may form in the adhesive as a result of being subjected to stress and the adhesive strength thereof may decrease. However, according to the configuration of the rotor 20 of this embodiment, as shown in FIG. 3B, each segment magnet 30 is sandwiched in the width direction by a plurality of the projections 24 provided on the rotor yoke 22. Thus, even if adhesive strength between the segment magnets 30 and the rotor yoke 22 decreases due to the adhesive, the situation in which a segment magnet 30 is adsorbed to an adjacent segment magnet 30 within the cylindrical cover 35 is avoided. In addition, detachment of the segment magnets 30 to the outside in the radial direction of the rotor 20 is prevented by the cylindrical cover 35, and the segment magnets 30 are restricted from moving in the axial direction of the rotor 20 by the flanges 35A, 35B of the cylindrical cover 35.

Moreover, in the rotor 20 of this embodiment, since the projections 24 are partially provided only at two locations in the axial direction of the rotor yoke 22, in comparison with projections being formed continuously between both ends in the axial direction of the rotor yoke 22, leakage of magnetism from the segment magnets 30 to the projections 24 can be inhibited. As a result, together with reductions in output torque of the motor 10 caused by magnetic leakage being minimized, torque ripple and cogging torque are also minimized, thereby making it possible to improve motor characteristics. Furthermore, the motor can be made smaller and lightweight as a result of minimizing decreases in output torque of the motor 10.

Moreover, in the rotor 20 of this embodiment, since projections 24 provided in pairs in the axial direction of the rotor yoke 22 are respectively arranged so as to be located closer to the central portion of the rotor yoke 22 in the axial direction than both ends 33 in the axial direction of the segment magnets 30, the length of the projections 24 in the axial direction of the rotor yoke 22 is only required to be the minimum required length for ensuring strength of the projections 24 and preventing concentration of stress in the segment magnets 30, thereby eliminating the need for the length of the projections 24 to be excessively long in consideration of shifting of the segment magnets 30 attributable to tolerance. Accordingly, magnetic leakage can be inhibited more effectively.

Moreover, in the case of arranging the projections 24 on both ends of the rotor yoke 22, if the rotor 20 shifts even slightly in the axial direction from the proper location thereof with respect to the stator 11, since a portion of the projections 24 protrude outside the stator 11, dispersion of motor characteristics become comparatively large even if that shift is within the allowed assembly range. In contrast, in the rotor 20 of this embodiment, since the projections 24 do not protrude outside the stator 11 in the case of a shift by the rotor 20 to the extent that is still within the allowed assembly range, dispersion of motor characteristics can be held to a comparatively low level.

Second Embodiment

Figure 5:
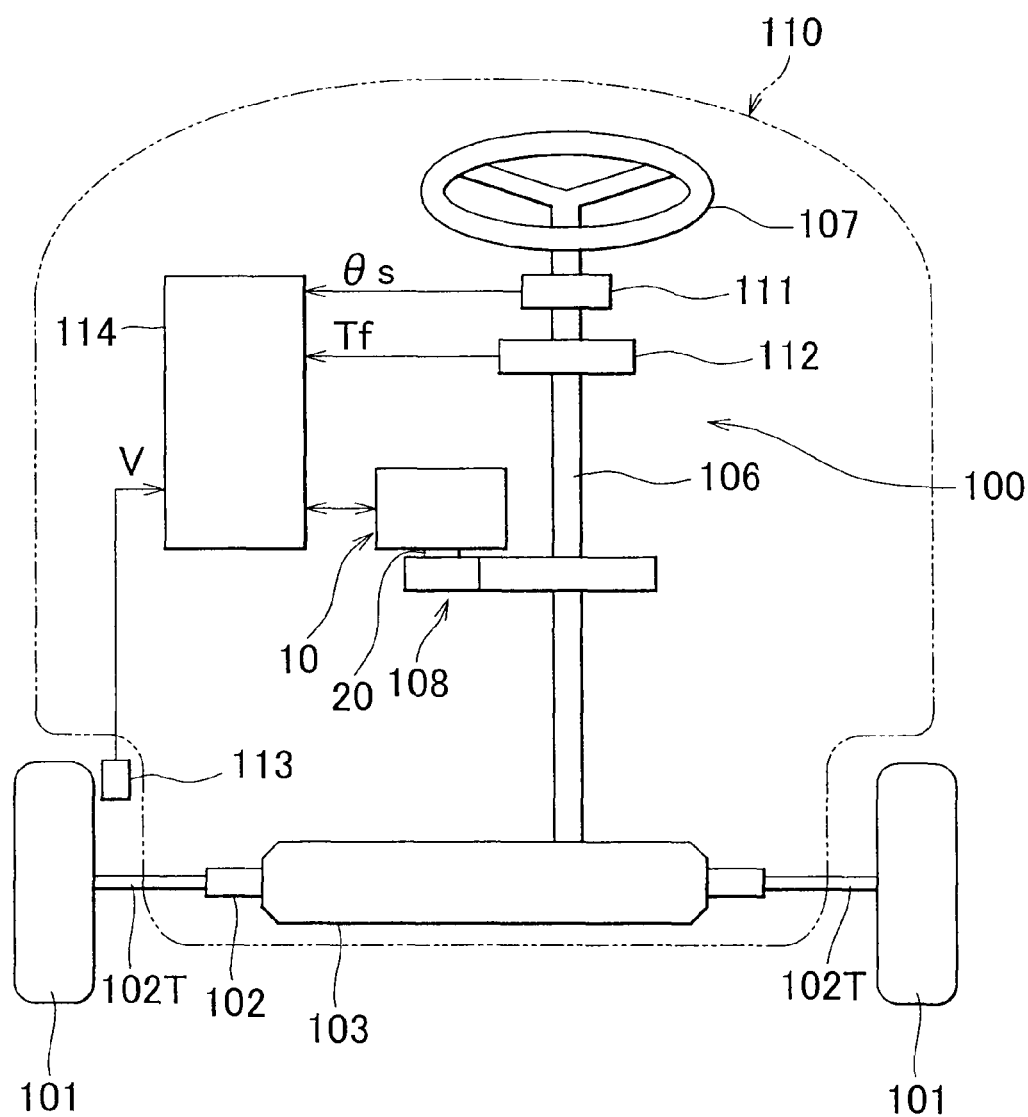
FIG. 5 is a conceptual drawing of an electric power steering apparatus.

The following provides an explanation of an embodiment of an electric power steering apparatus according to the invention. As shown in FIG. 5, an electric power steering apparatus 100 of this embodiment is provided with a turning wheel connecting shaft 102 extending between a pair of turning wheels 101 provided on a vehicle 110, and a shaft case 103 covering the outside of the turning wheel connecting shaft 102. Both ends of the turning wheel connecting shaft 102 are connected to each turning wheel 101 via tie rods 102T, and the shaft case 103 is fixed to the chassis of the vehicle 110. In addition, a rack (not shown) is formed at an intermediate portion of the turning wheel connecting shaft 102, and a pinion (not shown) passing through the intermediate portion of the shaft case 103 from the side meshes with this rack.

A steering shaft 106 is connected to the upper end of the pinion, and a steering wheel 107 is further connected to the upper end of the steering shaft 106. The rotor 20 of the motor 10 explained in the first embodiment is connected to an intermediate portion of the steering shaft 106 via a reduction gear groove 108. In addition, a steering angle sensor 111 and a torque sensor 112 are attached to the steering shaft 106, which together with detecting the steering angle θs of the steering wheel 107, detect the steering torque Tf applied to the steering shaft 106. Moreover, a velocity sensor 113 for detecting velocity V accompanying rotation of the turning wheels 101 is provided in the vicinity of the turning wheels 101. A steering control apparatus 114 drives the motor 10 corresponding to operating status based on the detection signals of the steering angle sensor 111, the torque sensor 112 and the velocity sensor 113, thereby enabling the turning wheels 101, 101 to be turned while the motor 10 assists operation of the steering wheel by a driver.

In this manner, the electric power steering apparatus 100 of this embodiment is provided with the motor 10 explained in the first embodiment as a drive source, and since the motor 10 has improved motor characteristics, the steering feel of the electric power steering apparatus 100 is stable.

Other Embodiments

The invention is not limited to the previously described embodiments, but rather embodiments in the manner of those explained to follow are also included within the scope of the invention. Moreover, in addition to the embodiments explained below, the invention can also be carried out by modifying in various ways within a range that does not deviate from the gist thereof.

(1) Although the segment magnets 30 are fixed to the rotor yoke 22 by an adhesive in the above-mentioned first embodiment, a structure may also be employed in which the segment magnets 30 are fixed to the rotor yoke 22 with the projections 24 and the cylindrical cover 35 only without using an adhesive. More specifically, a configuration is employed in which the segment magnets 30 are clamped from the direction of width between adjacent projections 24 sandwiched by the magnet fixing sections 23A.

(2) In addition, the segment magnets 30 may be fixed to the rotor yoke 22 with the projections 24 only without using an adhesive or the cylindrical cover 35. More specifically, in addition to making the cross-sectional shapes of both side surfaces 34 of the segment magnets 30 roughly trapezoidal by inclining towards the fixing flat surfaces 32 so as to move away from each other as they approach the fixing flat surfaces 32, the side surfaces 24S of the adjacent projections 24 on both sides of the magnet fixing sections 23A are inclined so as to move away from each other as they approach the magnet fixing sections 23A, thereby resulting in a configuration in which these side surfaces 24S and the side surfaces 32 of the segment magnets 30 make contact with each other. In addition, the segment magnets 30 are prevented from moving in the axial direction of the rotor 20 by frictionally locking the side surfaces 24S of the projections 24 with the side surfaces 34 of the segment magnets 30.

(3) Although the projections 24 are composed in the first embodiment by integrally forming protruding pieces 24K on the steel sheets 22K composing the rotor yoke 22 and laminating a plurality of the protruding pieces 24K, the projections 24 may be composed with components separate from the rotor yoke 22, and a configuration may be employed, for example, in which the projections 24 are fastened by screws to the boundary portions of adjacent magnet fixing sections 23A.

(4) In addition, although the rotor yoke 22 was composed by laminating the steel sheets 22K, it may also be composed with a mass of a magnetic material such as a compressed powder magnetic core compression molded with a die after mixing a magnetic metal powder and a resin powder.

Figure 6A:
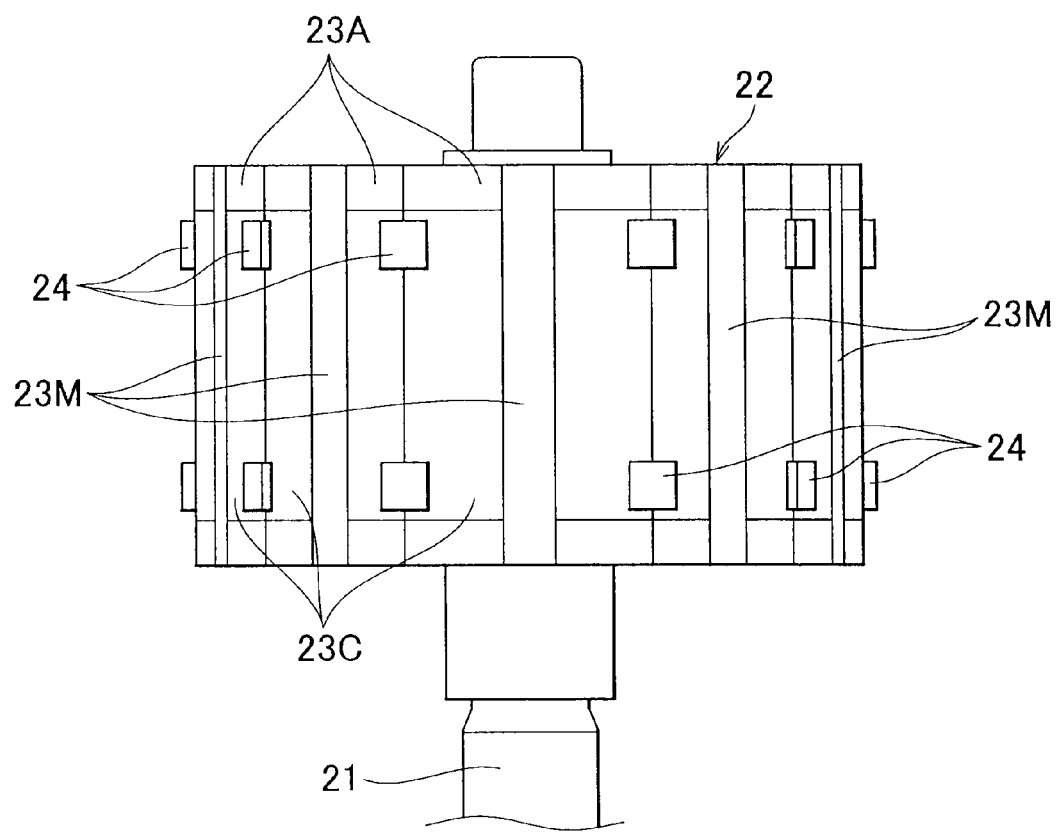
FIG. 6A is a side view of a rotor yoke according to a variation.
Figure 6B:
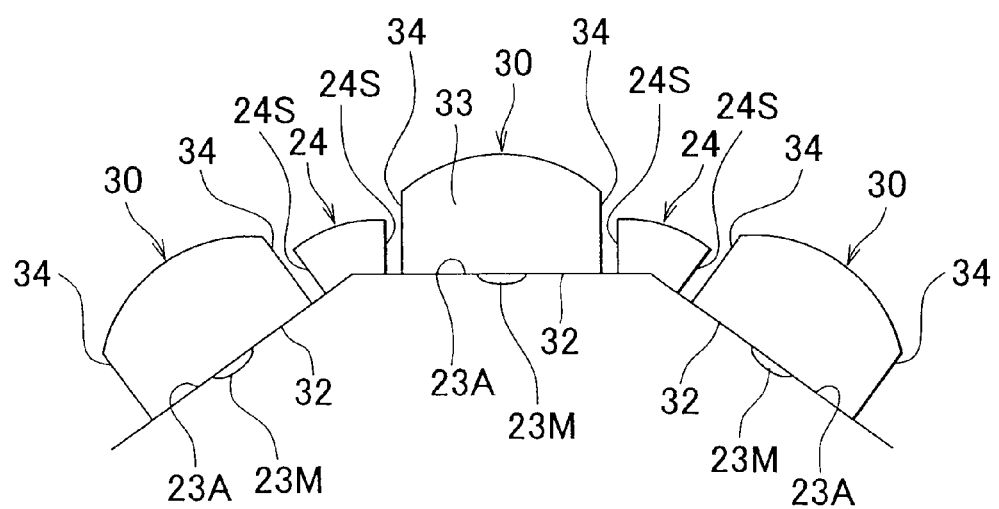
FIG. 6B is a front view of a rotor yoke according to a variation.

(5) As shown in FIGS. 6A and 6B, a shallow groove 23M extending between both ends in the axial direction of the rotor yoke 22 and depressed relative to the adhesive depression 23C is formed in each magnet fixing section 23A, and an adhesive may be received in the shallow groove 23M and the adhesive depression 23C. As a result, an adhesive layer of a prescribed thickness is also formed between both ends of the segment magnets 30 and the magnet fixing sections 23A, thereby enabling the segment magnets 30 and the magnet fixing sections 23A to be reliably adhered.

Figure 7:
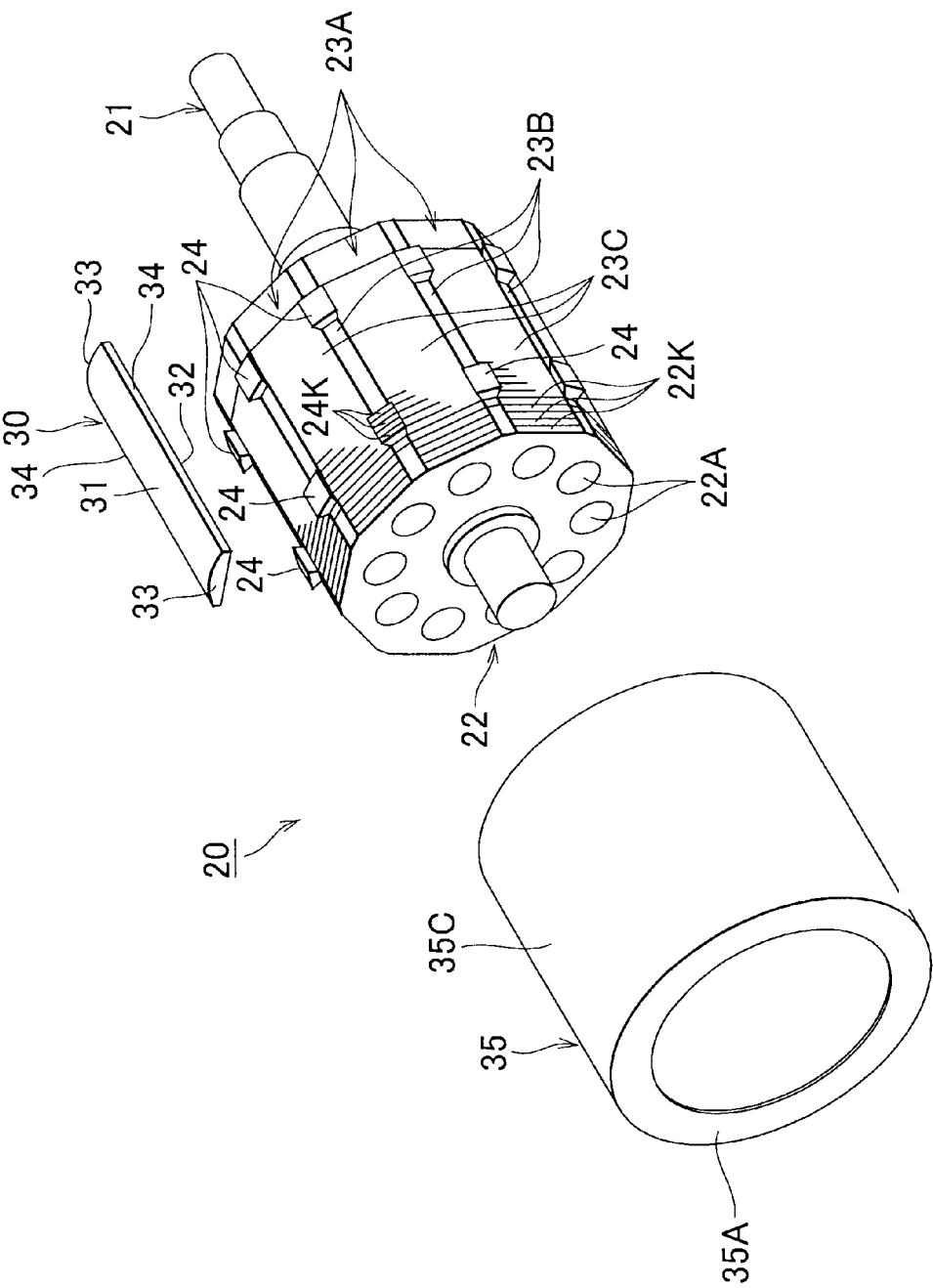
FIG. 7 is an exploded perspective view of a rotor according to a variation.
Figure 8A:
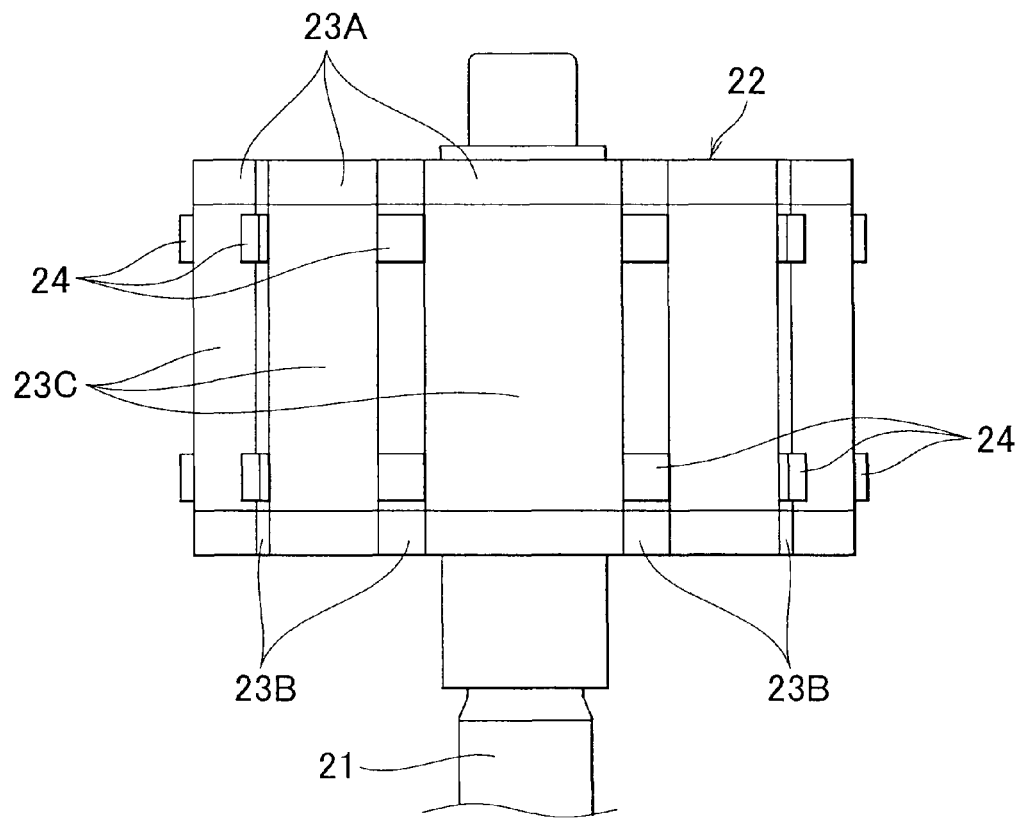
FIG. 8A is a side view of a rotor yoke according to a variation.
Figure 8B:
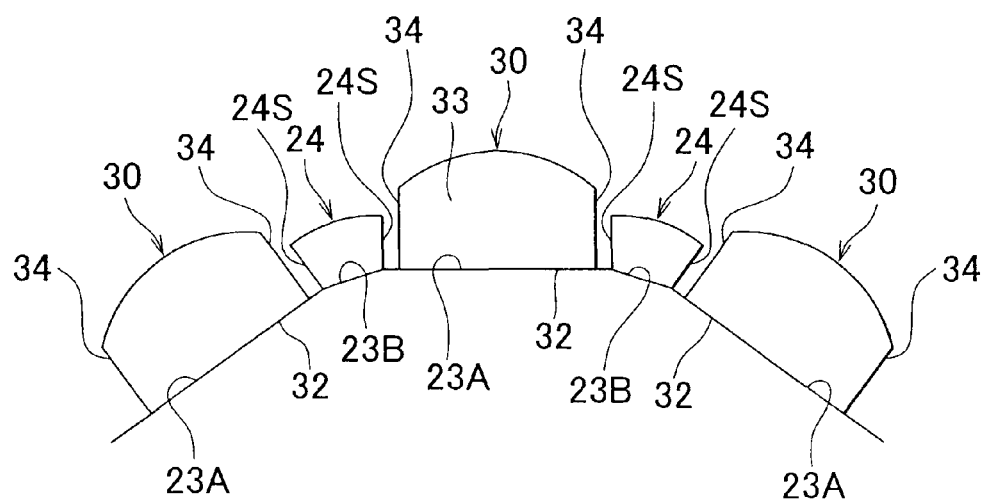
FIG. 8B is a front view of a rotor yoke according to a variation.
Figure 9:
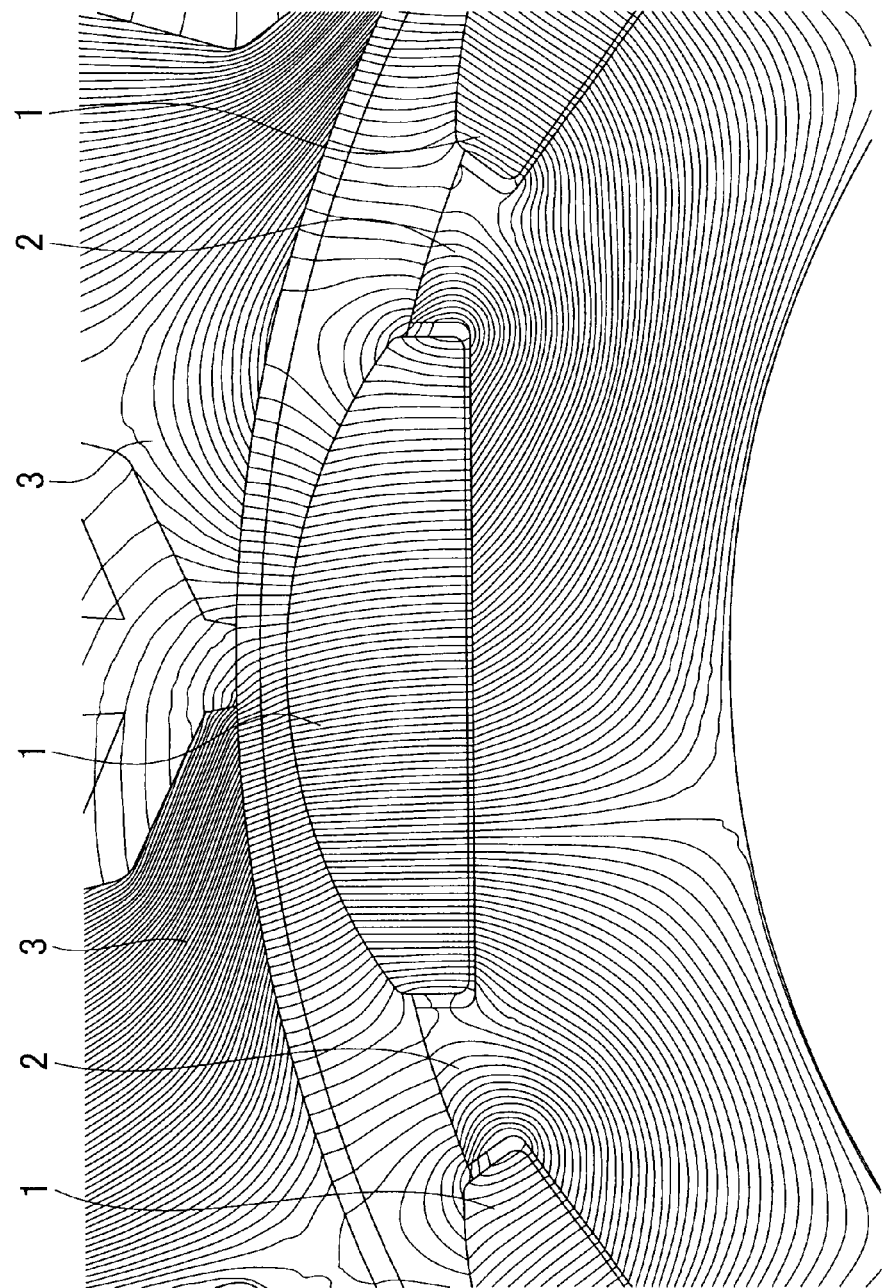
FIG. 9 is a magnetic flux distribution diagram of a motor of the related art.

(6) The rotor yoke 22 may also be configured in the following manner. Namely, as shown in FIG. 7, a flat surface 23B is formed at each corner of the polygon in the rotor yoke 22. As shown in FIGS. 8A and 8B, each projection 24 stands upright from this flat surface 23B, and both side surfaces 24S thereof are rising at roughly a right angle from the magnet fixing sections 23A located adjacent to the flat surface 23B on both sides. Here, although a configuration may be employed in which the portion of the flat surface 23B sandwiched between adjacent adhesive depressions 23C is depressed to an extremely shallow depth by the same amount as the depth of the adhesive depressions 23C relative to the portion not sandwiched between adjacent adhesive depressions 23C, this portion may also not be depressed. In the case of employing a configuration in which this portion is not depressed, since the portions where the flat surface 23B is formed protrude relative to the adhesive depressions 23C, all four sides of the adhesive depressions 23C are surrounded by a level difference, thereby making it possible to retain the adhesive within the adhesive depressions 23C.

(7) Although a configuration is employed in the above-mentioned first embodiments in which the projections 24 are arranged at locations sandwiched between adjacent adhesive depressions 23C in the central portion in the axial direction of the rotor yoke 22, a configuration may also be employed in which the projections 24 are arranged at locations not sandwiched between the adhesive depressions 23C (at both ends of the rotor yoke 22 in the axial direction).

(8) Although the invention is applied to a so-called column electric power steering apparatus, in which a motor 10 is coupled with a gear to an intermediate location of the steering shaft 106, in the above-mentioned second embodiments, the invention may also be applied to a so-called rack electric power steering apparatus in which the entire motor has a hollow structure, a ball nut is fixed therein, and the ball nut meshes with ball threads formed at an intermediate portion of the turning wheel connecting shaft 102, or the invention may be applied to a pinion electric power steering apparatus, in which a motor is coupled to a turning wheel connecting shaft with a rack and pinion mechanism. Moreover, the invention is not only applied to an electric power steering apparatus, but may also be applied to an industrial robot.

(9) Although the invention is applied to the rotor 20 of the motor 10 used as a drive source of an electric power steering apparatus 100 in the second embodiment, the invention may also be applied to a rotor of an industrial motor.

(10) Although the projections 24 are provided at locations shifted towards the center in the axial direction of the rotor yoke 22 from both ends 33 in the axial direction of the segment magnets 30 in the second embodiment, the projections 24 may also be provided so as to lie in the same plane as both ends in the axial direction of the rotor yoke 22.

What is claimed is:

1. A motor rotor comprising:
   a rotor yoke;
   a plurality of magnet fixing sections formed on the lateral surface of the rotor yoke,
   segment magnets respectively fixed to the magnet fixing sections and extending in the axial direction of the rotor yoke; and
   projections provided on the rotor yoke and protruding outward from the rotor yoke,
   wherein the projections are provided at each boundary section located between each of the adjacent magnet fixing sections and are provided in pairs in the axial direction of the rotor yoke, and
   wherein side surfaces of the projections extend upwardly from the plurality of magnet fixing sections and a clearance is provided between an entire length of each of the side surfaces of the projections and the segment magnets.

2. The motor rotor according to claim 1, wherein
   the projections provided in pairs in the axial direction of the rotor yoke are arranged at locations between each ends of the rotor yoke and the center of the rotor yoke in the axial direction.

3. The motor rotor according to claim 1, further comprising:
   an adhesive depression, which is formed by depressing the intermediate portion of the rotor yoke in the axial direction relative to both ends of the rotor yoke, and which is formed in each of the magnet fixing sections;
   wherein the projections are arranged at locations sandwiched by the adhesive depressions of the adjacent magnet fixing sections.

4. The motor rotor according to claim 3, further comprising:
   a groove that is provided in the adhesive depression.

5. The motor rotor according to claim 1, further comprising:
   a cylindrical cover that engages with the outside of the rotor yoke and covers the plurality of segment magnets.

6. The motor rotor according to claim 5, wherein
   the cylindrical cover includes a cylindrical portion, and a flange extending radially inward from an end in the axial direction of the cylindrical portion.

7. The motor rotor according to claim 1, wherein
   the rotor yoke is in the shape of a polygonal column.

8. The motor rotor according to claim 1, wherein
   the motor rotor is used in a motor of an electric power assisting steering apparatus for assisting steering effort from the steering wheel.

* * * * *